UNITED STATES PATENT OFFICE.

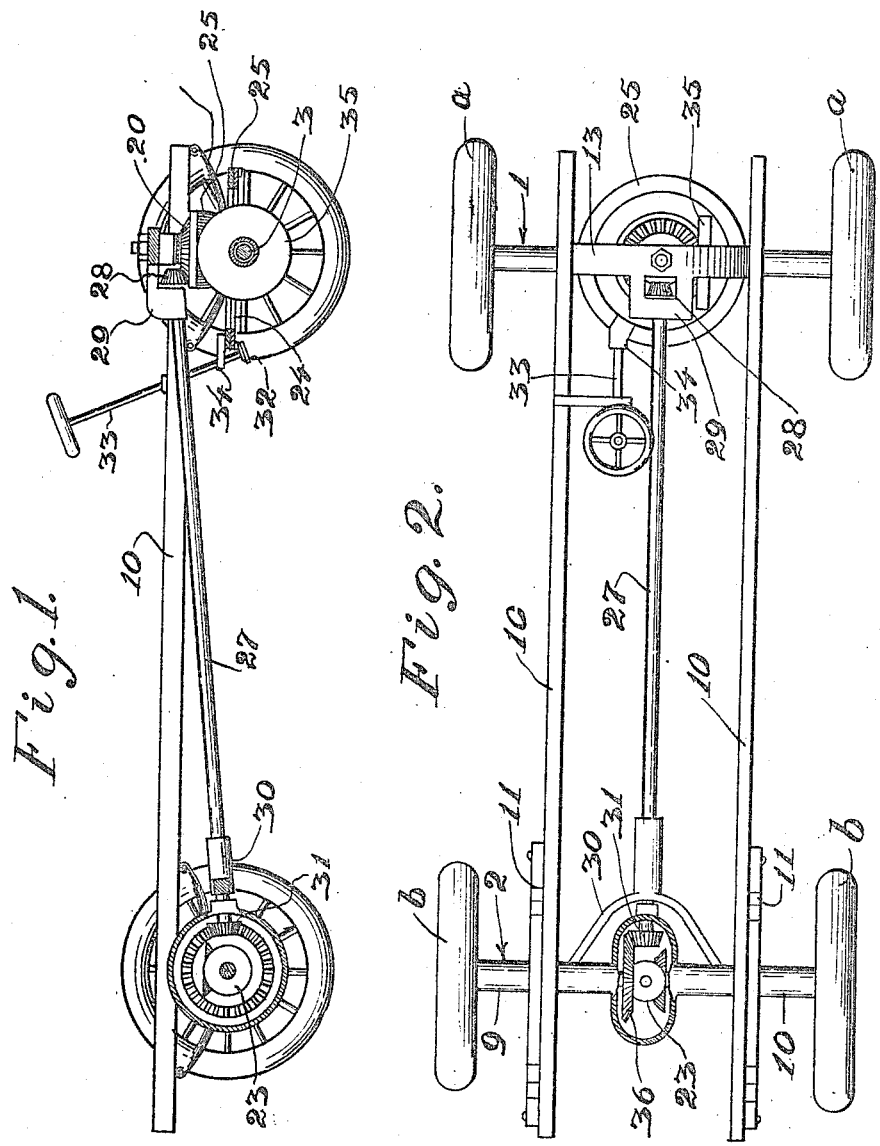

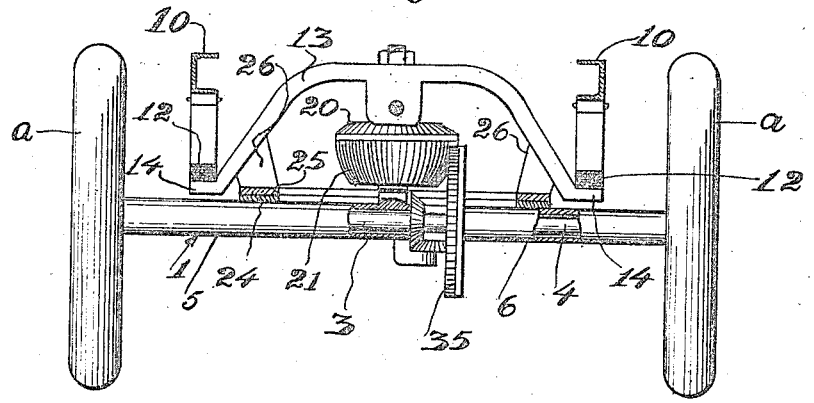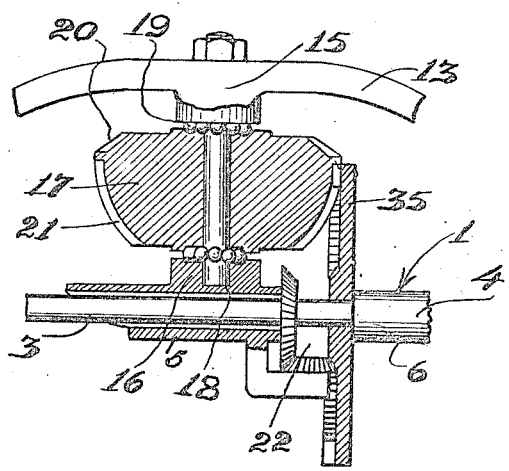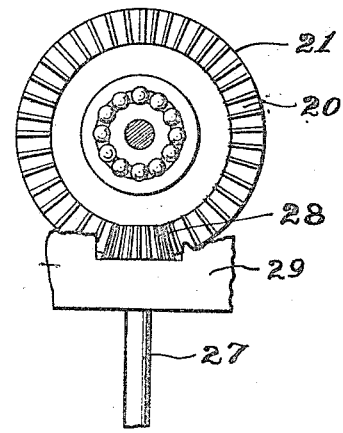

RALEIGH C. CRISWELL, OF CHICAGO, ILLINOIS, ASSIGNOR OF ONE-HALF TO GUY C. FLEMING, OF CHICAGO, ILLINOIS.

FRONT AND REAR DRIVE FOR AUTOVEHICLES.

1,155,216.  Specification of Letters Patent.  Patented Sept. 28, 1915.

Application filed January 13, 1915. Serial No. 2,064.

*To all whom it may concern:*

Be it known that I, RALEIGH C. CRISWELL, a citizen of the United States, residing at Chicago, in the county of Cook and State of Illinois, have invented certain new and useful Improvements in Front and Rear Drives for Autovehicles; and I do hereby declare the following to be a full, clear, and exact description of the invention, such as will enable others skilled in the art to which it appertains to make and use the same.

This invention relates to front and rear axle drives for automobiles and other vehicles, and one of the principal objects of the invention is to provide simple, reliable and efficient means for driving the front and rear axle and for permitting each of the wheels to turn independently of the other in rounding curves so that there will be no strain upon the axles or spinning of the tires.

The foregoing and other objects may be attained by means of the construction illustrated in the accompanying drawings, in which—

Figure 1 is a view in side elevation and partial section of a front and rear axle drive, made in accordance with this invention. Fig. 2 is a top plan view of the same, Fig. 3 is a front end elevation and partial section, Fig. 4 is a sectional view through the front axle gear, and Fig. 5 is a top plan view of one of the front axle gear wheels.

Referring to the drawings, the numeral 1 designates the front axle as an entirety and the numeral 2 designates the rear axle, as an entirety. The front axle is made in two sections 3 and 4 mounted in tubular bearings 5 and 6 and the wheels *a* are connected to the axle sections 3 and 4. The rear axle is similarly formed and connected, the axle members being mounted in hollow or tubular bearings 9 and 10, and the wheels *b* being mounted on the axle sections 7 and 8.

The frame or chassis 10 is supported from the tubular members of the axle upon springs 11 at the rear and springs 12 in front.

The front springs 12 are supported centrally by means of a yoke 13, the ends 14 of which extend underneath the centers of the springs 12 and support said spring above the front axle. The yoke 13 is pivotally mounted on a vertical stub shaft 15, and said stub shaft is mounted at its lower end in a socketed boss 16 formed on the tubular bearing member 5.

A double gear wheel 17 is mounted loosely upon the stub shaft 15 and is provided with ball bearings 18 and 19 at the upper and lower sides thereof, as shown more clearly in Fig. 4 of the drawings. The double gear wheel 17 is provided with beveled gear teeth 20 upon the upper side thereof and curved gear teeth 21 at the sides thereof and extending entirely around the gear.

A differential gearing indicated as an entirety at 22, is secured to the front axle members and the similar differential gear 23 is mounted on the rear axle members so as to permit independent rotation of the wheels *a* and *b*.

The lower fifth wheel member 24 is supported rigidly upon the tubular bearing members 5 and 6 of the front axle sections, and the upper fifth wheel member 25 is supported by braces 26 formed integral with the yoke 13. A central longitudinal shaft 27 is provided with a beveled gear 28 at its front end which meshes with the teeth 20 on the double gear 17, and said shaft is supported in a bracket 29 extending rearwardly from the yoke 13, while the rear end of the shaft 27 is supported in a bracket 30 mounted on the tubular bearings 9 and 10 of the rear axle members immediately in front of the differential gear 23. Upon the rear end of the shaft 27 is a beveled pinion 31.

The fifth wheel member 24 is provided with gear teeth upon its under side, and a pinion 32 mounted on the steering post 33 engages the gear teeth, and said steering post is mounted in a suitable bracket 34 extending rearwardly from the upper fifth wheel member 25. Mounted on the front axle member 4 is a large beveled gear wheel 35 which engages the gear teeth 21 on the double gear, and at the rear end of the shaft 27, the pinion 31 engages the large gear wheel 36 on the rear axle member 7.

From the foregoing it will be obvious that the front axle sections may be turned in either direction by the steering post, and that the front and rear axle sections are independently mounted so that in turning curves or corners, the wheels may have independent action.

Various changes may be made in the details of construction without departing from the spirit and scope of the invention as defined in the claims.

What is claimed is:—

1. A front and rear axle drive for vehicles comprising an axle consisting of axle sections mounted in tubular bearings, differential gearing on said axle members, a fifth wheel member secured to the front axle, a vertically disposed stub shaft mounted on said axle, a double gear wheel mounted on said stub shaft, and meshing with said differential gearing, a yoke supported on said double gear wheel, the ends of said yoke being extended underneath the vehicle springs, and the lower fifth wheel member being provided with gear teeth to be operated by a pinion on the steering post.

2. A front and rear axle drive for vehicles comprising axles consisting of axle sections, tubular bearings for said axle sections, differential gearing for said sections, a fifth wheel member mounted on the front axle, a vertical stub shaft mounted on the front axle, a double gear wheel mounted on said shaft to mesh with the differential gearing, and supported on ball bearings, a yoke pivoted to said shaft, front vehicle springs supported on said yoke, and a steering post and gear for operating the lower fifth wheel member to permit the wheel to have independent movement in rounding corners.

In testimony whereof I affix my signature in presence of two witnesses.

RALEIGH C. CRISWELL.

Witnesses:
W. C. DAVIS,
BENNETT S. JONES.